(12) United States Patent
Montejo

(10) Patent No.: US 9,637,291 B2
(45) Date of Patent: May 2, 2017

(54) MULTI-POSITIONAL CLOSURE FASTENER

(71) Applicant: Raul Eduardo Montejo, Merritt Island, FL (US)

(72) Inventor: Raul Eduardo Montejo, Merritt Island, FL (US)

( * ) Notice: Subject to any disclaimer, the term of this patent is extended or adjusted under 35 U.S.C. 154(b) by 49 days.

(21) Appl. No.: 14/670,298

(22) Filed: Mar. 26, 2015

(65) Prior Publication Data

US 2016/0280433 A1  Sep. 29, 2016

(51) Int. Cl.
*B65D 63/12* (2006.01)
*F16L 3/10* (2006.01)
*F16L 3/233* (2006.01)
*B65D 63/16* (2006.01)

(52) U.S. Cl.
CPC ............ *B65D 63/12* (2013.01); *B65D 63/16* (2013.01); *F16L 3/2334* (2013.01)

(58) Field of Classification Search
CPC ... Y10T 24/1498; Y10T 24/153; B65D 63/12; B65D 63/14; B65D 63/16; F16L 3/10; F16L 3/2332; F16L 3/2338
USPC ...................................................... 24/16 PB
See application file for complete search history.

(56) References Cited

U.S. PATENT DOCUMENTS

| | | | |
|---|---|---|---|
| 1,378,753 A | 5/1921 | Zwilling | |
| 2,650,590 A | 9/1953 | Moore et al. | |
| 3,570,554 A * | 3/1971 | Kabel | B65B 13/345 100/2 |
| 3,654,669 A * | 4/1972 | Fulton | B65D 63/14 24/16 PB |
| 3,970,331 A | 7/1976 | Giulie | |
| 4,071,023 A | 1/1978 | Gregory | |
| 4,422,217 A * | 12/1983 | Barrette | B65D 63/16 24/16 PB |
| 4,498,507 A * | 2/1985 | Thompson | B65B 13/345 140/93.2 |
| 4,665,588 A * | 5/1987 | Nakano | F16B 2/08 24/16 PB |
| 4,862,560 A * | 9/1989 | Lichtenberg | B65D 63/16 24/16 PB |
| 4,910,831 A | 3/1990 | Bingold | |

(Continued)

*Primary Examiner* — Robert J Sandy
*Assistant Examiner* — Rowland Do
(74) *Attorney, Agent, or Firm* — Brian S. Steinberger; Law Offices of Brian S. Steinberger, P.A.

(57) ABSTRACT

A multi-positional closure fastener includes a plurality of receivers that orient at different relative angles and elevations. The receivers include tapered sidewalls that enable rotational motion between adjacent receivers. This multi-positional disposition of adjacent receivers facilitates the reception by the receivers of zip tie-styled straps from multiple angles, elevations, and directions. This is because there are greater possibilities of proximity between the straps and the receivers due to the multiple possible orientations and flexible movement of the receivers. This proximal positioning creates a more aligned, linear connection between corresponding receivers and straps; thus resulting in reduced stress on the straps. Each receiver comprises a housing having an opening. The openings are where the insertion tab from the straps are inserted and fastened into place. A fastening mechanism in the opening of the housing locks with an insertion tab from the strap to form the fastened closure.

18 Claims, 7 Drawing Sheets

(56) References Cited

U.S. PATENT DOCUMENTS

| | | | |
|---|---|---|---|
| 4,993,669 A * | 2/1991 | Dyer | B65D 63/16 24/16 PB |
| 5,088,158 A | 2/1992 | Burkholder | |
| 5,102,075 A * | 4/1992 | Dyer | B65D 63/16 24/16 PB |
| 5,119,528 A | 6/1992 | Ono et al. | |
| 5,121,524 A * | 6/1992 | Mortensen | B65D 63/1036 24/16 PB |
| 5,159,728 A | 11/1992 | Bingold | |
| 5,193,251 A * | 3/1993 | Fortsch | B65D 63/14 24/16 PB |
| 5,226,360 A | 7/1993 | Kramka | |
| 5,234,245 A | 8/1993 | Peterson et al. | |
| 5,257,870 A | 11/1993 | Bennett et al. | |
| D347,156 S | 5/1994 | Starrett et al. | |
| 5,398,383 A * | 3/1995 | Bingold | E05B 75/00 24/16 PB |
| 5,443,155 A | 8/1995 | Robinson | |
| D372,099 S | 7/1996 | Troy et al. | |
| 5,544,391 A * | 8/1996 | Hoffman | B65D 63/14 24/16 PB |
| 5,651,376 A | 7/1997 | Thompson | |
| 5,802,675 A * | 9/1998 | Parsons | E05B 75/00 24/16 PB |
| 5,802,888 A | 9/1998 | Parsons | |
| 5,988,925 A | 11/1999 | Baggett | |
| 6,128,809 A * | 10/2000 | Khokhar | F16L 3/2338 24/136 R |
| 6,196,033 B1 * | 3/2001 | Dowdle | E05B 75/00 24/16 PB |
| 6,227,399 B1 | 5/2001 | Angus et al. | |
| 6,240,602 B1 * | 6/2001 | Geiger | F16L 3/137 24/16 PB |
| 6,364,257 B1 * | 4/2002 | Holder | F16L 3/2336 24/16 PB |
| 6,507,979 B1 * | 1/2003 | Thompson | E05B 75/00 24/16 PB |
| 6,532,631 B2 | 3/2003 | Rohaly | B65D 63/16 24/16 PB |
| 6,793,435 B2 | 9/2004 | Higashino et al. | |
| 6,807,715 B1 | 10/2004 | Blair | |
| 6,845,577 B1 | 1/2005 | Downes | |
| 6,961,979 B2 | 11/2005 | Wendle | |
| 7,120,968 B2 | 10/2006 | Huene et al. | |
| 7,131,168 B2 | 11/2006 | Pangallo | |
| 7,207,740 B1 | 4/2007 | Baggett | |
| 7,243,399 B2 | 7/2007 | Liao | |
| 7,437,804 B1 | 10/2008 | Geiger et al. | |
| 7,789,414 B2 * | 9/2010 | Blackburn | B60R 21/213 24/16 PB |
| 7,882,599 B2 | 2/2011 | Harrington | |
| 7,934,296 B2 | 5/2011 | Okamoto | |
| 8,387,215 B2 | 3/2013 | Koncelik, Jr. | |
| 8,474,104 B2 | 7/2013 | Watson | |
| 8,978,210 B2 * | 3/2015 | Arjomand | B65D 63/14 24/16 PB |
| 8,978,211 B2 * | 3/2015 | Arjomand | B65D 63/1027 24/16 PB |
| 9,038,246 B2 | 5/2015 | Liang | |
| 9,067,717 B2 | 6/2015 | Demik et al. | |
| D739,714 S * | 9/2015 | Geiger | D8/356 |
| 9,321,571 B2 | 4/2016 | Griggio | |
| D756,203 S | 5/2016 | Kelleghan | |
| 9,328,539 B1 | 5/2016 | Lonardo et al. | |
| 2003/0074821 A1 | 4/2003 | Goodin et al. | |
| 2005/0076478 A1 | 4/2005 | Miyazaki et al. | |
| 2006/0244244 A1 * | 11/2006 | Blackburn | B60R 21/213 280/728.2 |
| 2007/0067965 A1 * | 3/2007 | Sugiyama | B65D 63/14 24/16 PB |
| 2007/0119030 A1 * | 5/2007 | Hoffman | B65D 63/14 24/16 PB |
| 2007/0234524 A1 * | 10/2007 | Witt | B65D 63/14 24/16 PB |
| 2008/0276432 A1 | 11/2008 | McNeill | |
| 2009/0077773 A1 * | 3/2009 | Harrington | B65D 63/1072 24/16 PB |
| 2011/0131768 A1 * | 6/2011 | Watson | B65D 63/1063 24/16 PB |
| 2011/0194908 A1 | 8/2011 | Collins et al. | |
| 2011/0314641 A1 | 12/2011 | Sun | |
| 2015/0033509 A1 | 2/2015 | Dietrich | |
| 2015/0368015 A1 * | 12/2015 | Steinman | B65D 63/1027 24/16 PB |
| 2016/0001945 A1 * | 1/2016 | Foreman | F16L 3/222 29/525.03 |
| 2016/0325897 A1 | 11/2016 | Kierstead | |

\* cited by examiner

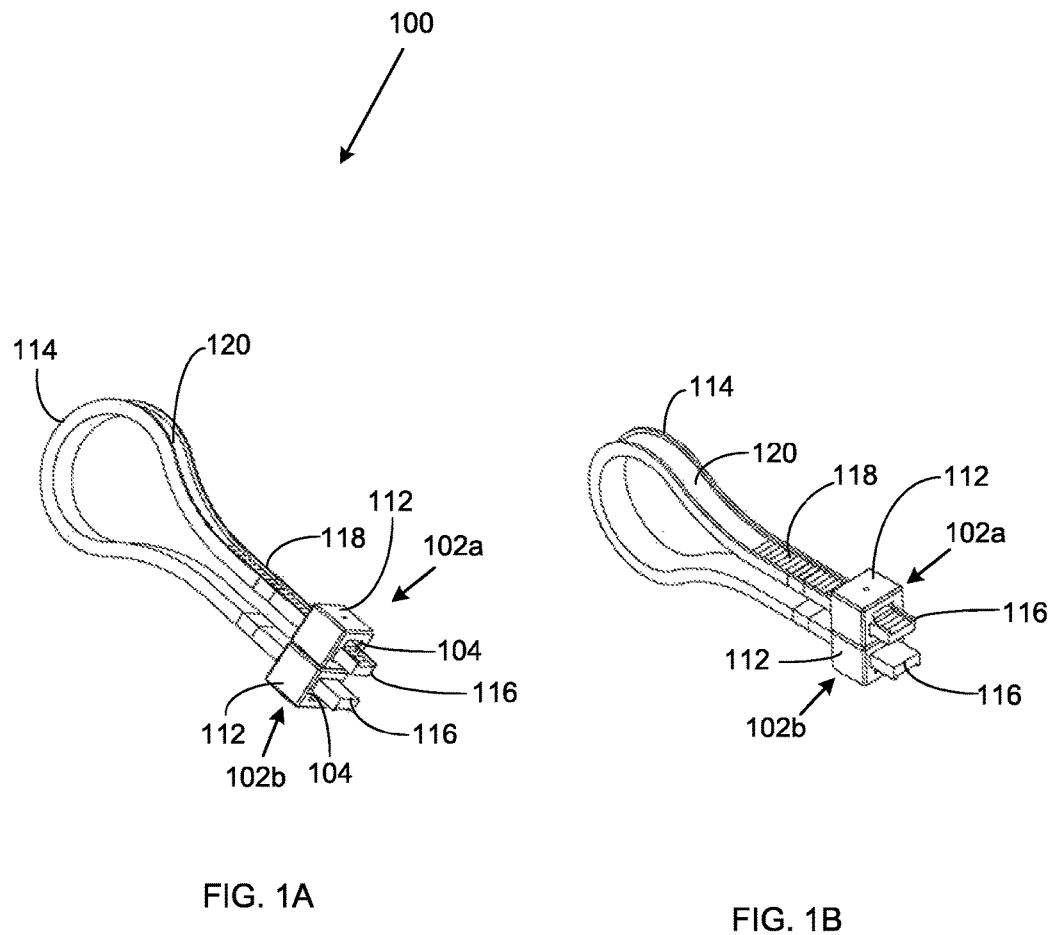

MULTI-POSITIONAL CLOSURE FASTENER

BACKGROUND

Typically, a zip tie is configured to securely retain multiple items together in a bundle or hang the item from a mounting surface. Because of their low cost and ease of use, zip ties are ubiquitous, finding use in a wide range of other applications. The zip tie generally uses a closure at one end and an insertion tab at the terminus of the opposite end.

Through observation, the inventor was aware that multiple wires, tubes, and linear items were often retained and guided with a strap and a closure fastener that secured the insertion tab of the strap into a closed loop around the items. The inventor saw that, often, the items being retained within the straps were complex combinations of wires and pipes that required segregated bundling. This wiring would often have to pass through numerous channels and bend around corners. The strap holding the wiring would be oriented in multiple directions, angles, and elevations. This made fastening the strap with a closure fastener difficult. One specific example the inventor knew about was aircraft wiring.

Unfortunately, since the straps and wiring arrived at the closure fastener from multiple dispositions, they often wore down and broke after chaffing and frictional engagement with other surfaces. The chaffing also occurred as the straps and fastening closures were fastened into closure at odd angles, which created great stress on the straps and wires. Also, the straps passed around corners and through tight channels, which created greater stress.

The inventor was aware that the common zip tie, normally made of nylon, has a tape section with teeth that engage with a pawl in the head to form a ratchet so that as the free end of the tape section is pulled the tie-wrap tightens and does not come undone. Another version of the tie-wrap allows a tab to be depressed to either adjust the tension or remove the ty-wrap.

Through research, the inventor learned that the most common zip tie consists of a sturdy nylon tape with an integrated gear rack, and on one end a ratchet within a small open case. The inventor recognized that once the pointed tip of the cable tie has been pulled through the case and past the ratchet, it is prevented from being pulled back; the resulting loop may only be pulled tighter. This allows multiple items to be bound together and removed separately, as needed.

The inventor also learned that a cable tie tensioning tool could be used to apply the zip tie with a specific degree of tension. The tool can cut off the extra tail flush with the head in order to avoid a sharp edge which might otherwise cause injury.

However, the inventor recognized that the angle of engagement between the closure fastener and the tab at the terminus of the zip tie were often oriented in different directions. This created stress on the zip tie as it attempted to loop around the wires and fasten the closure closed. As a result, the diameter of formed loop, length, angle of orientation for a typical zip tie was limited. For example, to create a larger loop required the inventor to stretch the zip tie. Or to change directions of the connection around bulky objects was problematic.

The inventor decided that, rather than to redesign the zip tie, he would construct a multiple closure fasteners that oriented in slightly different angles and elevations. This created more entry options for the insertion tab of the zip tie. The straps were then wrapped around the wires using this configuration of closure fasteners.

However, the inventor saw that there was still stress on the zip tie. The inventor recognized that greater flexibility was needed between adjacent closures. Through trial and error, the inventor learned that by cutting a small wedge between adjacent closures, they could be made to pivot relative to each other. This pivoting, lateral motion formed more entry options for the closure at various angles and orientations with the closures. The inventor finally developed a tensioning cutting member that smoothly cut either end of the zip tie through tension.

Zip ties have been used for economically and efficiently mounting objects and bundling items in the past, yet none with the present characteristics of the present invention. See patent numbers: U.S. 20120272485; U.S. Pat. Nos. 5,758, 390; and 8,739,387.

For the foregoing reasons, there is a need for a multi-positional closure fastener that fastens to a plurality of multi-directional straps to bundle together or mount items while minimizing stress on the straps.

SUMMARY

The present invention describes a multi-positional closure fastener that is configured to create a relaxed, less stressful fastening closure for a plurality of straps used to bundle together and tie at least one item together. The fastener is configured to provide fastening closure to a plurality of straps that engage the fastener from multiple directions, angles, and elevations. The fastener is oriented, such that the straps are not stressed when engaging and fastening to the fastener.

The multi-positional closure fastener includes a plurality of receivers disposed adjacently, and in nonplanar alignment with each other. The receivers orient at different angles and elevations relative to each other. The receivers may include tapered sidewalls that enable a slight rotational motion between adjacent receivers. Furthermore, the receivers may have openings that face in the same or opposite directions.

The multi-positional and flexible disposition of the receivers facilitates a fastening engagement with a plurality of straps; and especially straps arriving from multiple directions and angles. This is because the orientation and general arrangement of the receivers provides greater possibilities of proximity with any one of the straps, due to the variously angled and elevated orientations, as well as the slight pivotal movement by the receivers. This proximal positioning creates a more aligned, linear engagement between corresponding straps and receivers; thus resulting in reduced stress on the straps.

Each receiver is configured to receive and securely fasten to an insertion tab from a plurality of straps. The straps may be oriented to approach the proximity of the receivers from multiple directions and angles. Thus, in one embodiment, multiple insertion tabs from a plurality of straps may fasten to different receivers at an orientation that creates minimal stress on the straps. This more relaxed disposition of the straps relative to the receivers is possible because each receiver can orient more proximally to a corresponding strap tab due to their varying angles and elevations.

In one embodiment, the multi-positional closure fastener and the corresponding straps are configured to bundle multiple items while creating the minimal amount of stress on the straps, the receivers, and the items being retained by the straps. The multi-positional closure fastener is especially effective for fastening multiple straps that approach a corresponding receiver while retaining different items, such as large, complex wiring or tubing systems.

For example, the straps may form closures around wires or pipes that are disposed at various angles, often twisting, torquing, looping around corners and channels. In order for the wires and strap to reach a receiver for fastening closure, twisting, stretching and pressing against corners may be necessary. Unfortunately, this may cause chaffing and wear on the strap before engagement with the receiver to form the closure. Thus, the multi-positional and flexible receivers are efficacious for helping the insertion tab for each strap find the most proximal, aligned corresponding receiver. This in turn, reduces chaffing of the straps and wires, as more relaxed fastening is allowed.

In some embodiments, the multi-positional closure fastener comprises a plurality of receivers. The receivers are disposed adjacently to each other. In one embodiment, two receivers position adjacently. However, in other embodiments, three or more receivers may be adjacently disposed relative to each other. Each receiver is defined by a housing having an opening. The housing for each receiver is oriented in a different plane than an adjacent housing. For example, a first housing may be slightly elevated or misaligned with a second housing.

In some embodiments, the housing for each receiver has at least one tapered sidewall. As a result of this tapered configuration, the housing may take any shape, beyond a square or rectangular shape, including a trapezoid, a rhombus, a triangle, and a semi-circular shape. The tapered sidewall enables pivotal motion between adjacent housings. Consequentially, the pivotal motion of the housing creates a more proximal, less stressful entry for the straps into the housing.

In a further possibility, the opening for each receiver is oriented at a different angle than an adjacent opening. In some embodiments, the openings may face in the same direction. However, in other embodiments, the openings on adjacent housings face opposite directions. This also creates greater entry possibilities for the straps into the openings of the housing by creating a more proximal, less stressful entry. In some embodiments, a fastening mechanism is disposed to position within the opening of each housing. The fastening mechanism is configured to enable secure, single direction fastening of the straps with the receivers.

As discussed above, each receiver is defined by an opening. The openings are generally where the insertion tab from the straps are inserted and locked into place. A fastening mechanism rests in the opening of the housing for this function. The fastening mechanism may include a simple ratcheting device, as those found in zip tie fasteners. The fastening mechanism is configured to engage and fasten to an insertion tab from the strap.

In one possible embodiment, the strap is a traditional nylon zip tie. The strap is defined by an insertion tab on one of its ends that is configured to be inserted into any adjacent openings of adjacent housings. In this manner, myriad combinations of multi-positional closure fasteners and straps can fasten together to expand the diameters and lengths of the straps for fastening, while also forming the minimal stress on the straps.

One objective of the present invention is to provide a multi-positional closure fastener that enables a plurality of straps from different angles and elevations to fasten with a corresponding receiver having the most similar angle, elevation, and orientation.

Another objective is to minimize stress, such as chaffing, tearing, and frictional wear on the straps by fastening each strap with a similarly oriented and elevated receiver.

Another objective is to provide a multi-positional closure fastener that works in conjunction with a plurality of straps, such as a traditional zip tie, to expand the diameter and length of the fasteners.

Another objective is to provide a fastening mechanism in the opening of the receiver that locks the insertion tab from the straps into a desired disposition.

Yet another objective is to provide at least two adjacent receivers for fastening with a plurality of straps.

Yet another objective is to provide at least one tapered sidewall on the housing to enable a slight rotational motion between adjacent housings.

Yet another objective is to provide multiple closures at each end of the strap to create more fastening combinations and applications.

Yet another objective is to provide an inexpensive to manufacture multi-positional closure fastener that is compatible with traditional zip ties.

DRAWINGS

These and other features, aspects, and advantages of the present invention will become better understood with regard to the following description, appended claims, and drawings where:

FIGS. 1A and 1B are perspective views of an exemplary multi-positional closure fastener fastening an exemplary strap;

FIGS. 2A, 2B, 2C, and 2D are perspective views of a pair of exemplary housings in different rotational dispositions;

FIGS. 3A and 3B are top views of a pair of housings in different rotational dispositions;

FIGS. 4A, 4B, and 4C are perspective views of a pair of housings receiving a strap in different rotational dispositions;

DESCRIPTION

Figure 2A:
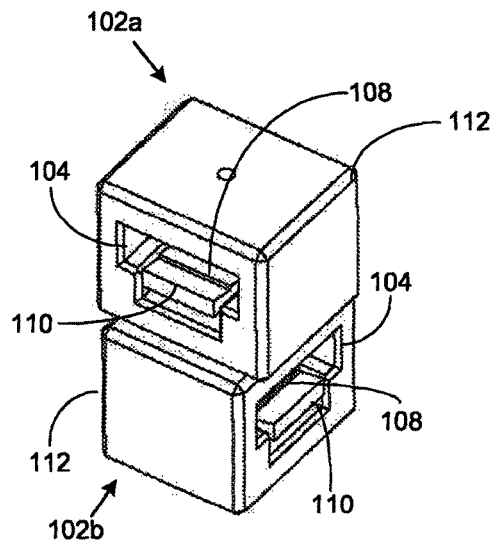

One embodiment, referenced in FIGS. 1A-8, illustrates a multi-positional closure fastener 100, hereinafter "fastener" that is configured to create a relaxed, less stressful fastening closure for a plurality of straps 114 used to bundle together and tie at least one item together. The fastener 100 is configured to provide a fastening closure to a plurality of straps 114 that engage the fastener 100 from multiple directions, angles, and elevations. The fastener 100 is oriented, such that the straps 114 are not stressed when engaging and fastening to the fastener 100.

As referenced in FIG. 1A, the fastener 100 may include a plurality of receivers 102a, 102b that receive and fasten the straps 114. The receivers 102a, 102b are disposed adjacently, and in nonplanar alignment with each other. The receivers 102a, 102b orient at different angles and elevations relative to each other. The receivers 102a, 102b may further include tapered sidewalls that enable a slight rotational motion between adjacent receivers 102a, 102b. Furthermore, the receivers 102a, 102b may have openings 104 that face in the same or opposite directions. The receivers 102a, 102b may also have eclectic types of numbers, angles, lengths, widths, and diameters.

As shown in FIG. 1B, the receivers 102a, 102b may be similarly constructed as a zip tie closure, except for their adjacent, multi-positional disposition. Also, the straps 114 may be similarly constructed as a zip tie. In some embodiments, the fastener 100 and the strap 114 may join to retain items, and thus form substantially the same configuration as bundling fasteners that include, a zip tie, a cable tie, a wire guide, and a hose tie.

The multi-positional and flexible disposition of the receivers 102a, 102b facilitates relaxed, fastening engagement with the straps 114. This is because the orientation and general arrangement of the receivers 102a, 102b provides greater possibilities of proximity with any one of the straps 114, due to the variously angled and elevated orientations, as well as the slight pivotal movement by the receivers 102a, 102b. This proximal positioning creates a more aligned, linear engagement between corresponding straps 114 and receivers 102a, 102b; thus resulting in reduced stress on the straps 114.

Each receiver 102a, 102b is configured to receive and securely fasten to an insertion tab 116 from the strap 114. The strap 114 may be oriented to approach the most proximal receiver 102a from multiple directions and angles. Thus, in one embodiment, multiple insertion tabs 116 from a plurality of straps 114 may fasten to different receivers 102a, 102b at an orientation that creates minimal stress on the straps 114. This more relaxed disposition of the straps 114 relative to the receivers 102a, 102b is possible because each receiver 102a, 102b can orient more proximally to a corresponding strap 114 due to their varying angles and elevations.

In one embodiment, the fastener 100 and the corresponding strap 114 are configured to help secure an item to a mounting surface, and to bundle multiple items while creating the minimal amount of stress on the straps 114, the receivers 102a, 102b, and the items being retained by the straps 114. The multi-positional closure fastener 100 is especially effective for fastening multiple straps 114 that approach a corresponding receiver 102a, 102b while retaining different items, such as large, complex wiring or tubing systems.

For example, the myriad wiring in an aircraft requires a plurality of straps 114 to guide and securely retain the different types and sizes of wires. The insertion tab 116 for each strap 114 must form closures around the wires at various angles; often twisting, torqueing, looping around corners and channels in the aircraft to reach a proximal receiver and achieve the fastening closure. In order for the wires and strap 114 to reach the receivers 102a, 102b, twisting, stretching and looping around corners and channels in the aircraft may be necessary to reach the most proximal receiver 102a.

Unfortunately, this may cause chaffing and wear on the strap 114 and wires before they engage the receivers 102a, 102b. Thus, in this configuration, the multi-positional and pivotally movable receivers 102a, 102b is effective for helping the insertion tab 116 of each strap 114 find the most proximal, aligned corresponding receiver 102a, 102b. This reduces chaffing of the straps 114 and wires, as a more relaxed fastened closure is allowed.

Turning now to FIG. 2A, the fastener 100 comprises a plurality of receivers 102a, 102b. The receivers 102a, 102b are disposed adjacently to each other. In one embodiment, two receivers 102a, 102b position adjacently. However, in other embodiments, three or more receivers 102a, 102b may be adjacently disposed relative to each other. Each receiver 102a, 102b is defined by a housing 112 having an opening 104. The housing 112 for each receiver 102a, 102b is oriented in a different plane than an adjacent housing 112. For example, a first housing may be slightly elevated or misaligned with a second housing.

Figure 2B:
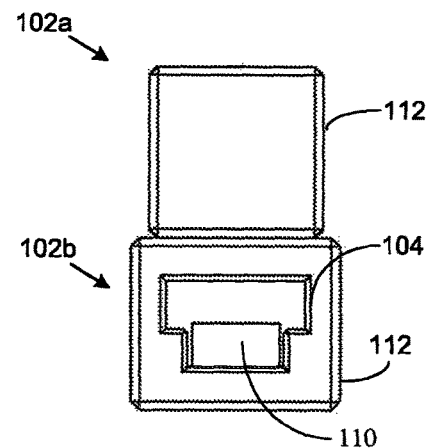
Figure 2C:
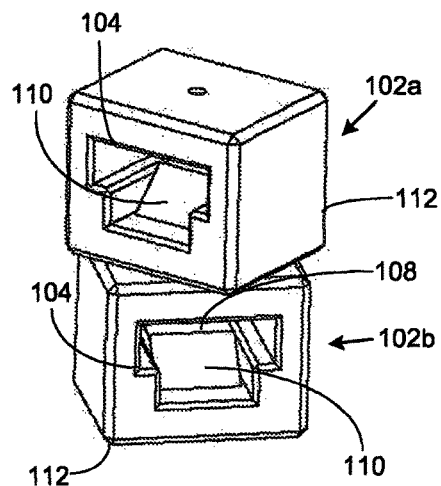
Figure 2D:
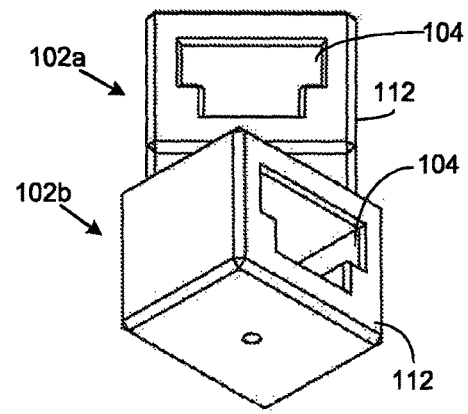
Figure 3A:
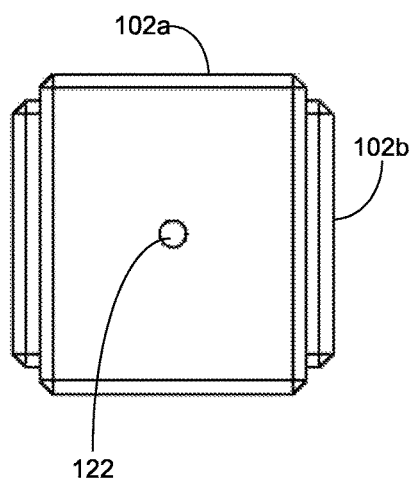
Figure 3B:
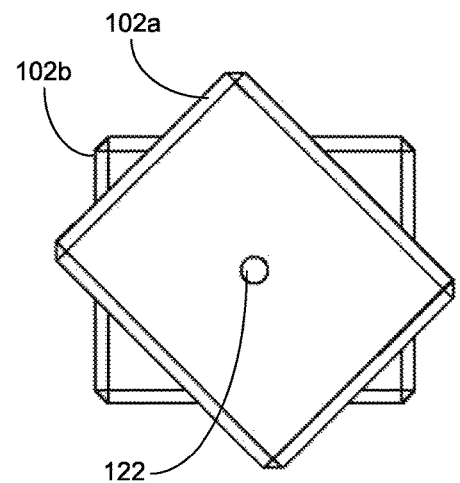

As referenced in FIGS. 2B and 2C, the housing 112 for each receiver 102a, 102b has at least one tapered sidewall. As a result of this tapered configuration, the housing 112 may take any shape, beyond a square or rectangular shape, including a trapezoid, a rhombus, a triangle, and a semi-circular shape. The tapered sidewall enables pivotal motion between adjacent housings 112 (FIG. 2D). In one embodiment, a pin hole 122 enables a pin to pass concentrically through each housing 112 to enable the pivotal/rotational relative movement between housings 112. Consequentially, the pivotal motion of the housing 112 creates a more proximal, less stressful entry for the straps 114 into the housing 112. For example, FIGS. 3A and 3B illustrate top views of a pair of adjacent housings 112 aligned (FIG. 3A), and rotated at about 45° relative to each other (FIG. 3B). Each housing 112 may be rotated to minimize stress on the attached strap 114. However, in each disposition, the housings 112 are generally coplanar.

Figure 4A:
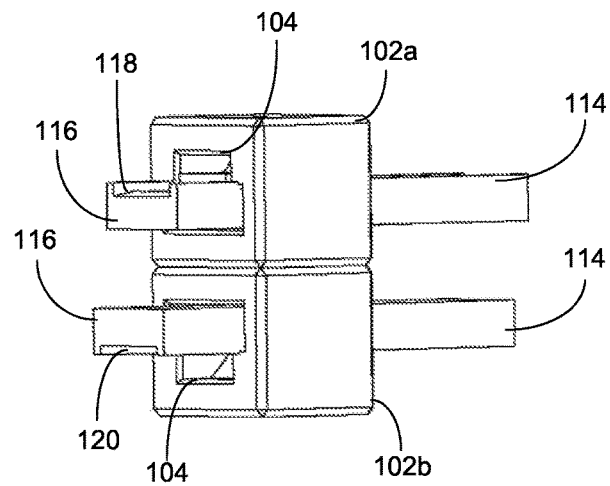
Figure 4B:
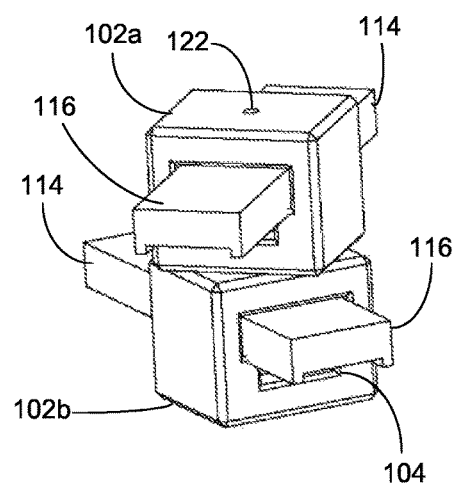
Figure 4C:
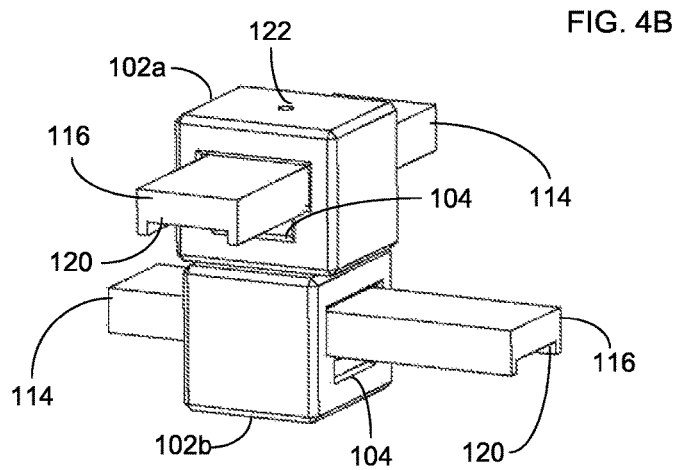

In a further possibility, the opening 104 for each housing 112 is oriented at a different angle than an adjacent opening 104. In some embodiments, the openings 104 may face in the same direction (FIG. 4A). However, in other embodiments, the opening 104s on adjacent housings 112 face opposite or misaligned directions (FIGS. 4B and 4C). This also creates greater entry possibilities for the straps 114 into the openings 104 of the housing 112 by creating a more proximal, less stressful entry. In some embodiments, a fastening mechanism 108 is disposed to position within the opening 104 of each housing 112. The fastening mechanism 108 is configured to enable secure, single direction fastening of the straps 114 with the receivers 102a, 102b.

As discussed above, the housing 112 is defined by an opening 104. The opening 104 is generally where the insertion tab 116 from the straps 114 are inserted and locked into place. A fastening mechanism 108 rests in the opening 104 of the housing 112 for this function. The fastening mechanism 108 may include a simple ratcheting device, as those found in zip tie fasteners. The fastening mechanism 108 is configured to engage and fasten to the insertion tab 116 from the strap 114. The fastening mechanism 108 may include a hinged latch 110 that selectively locks down on a gear rack in the insertion tab 116.

Figure 5:
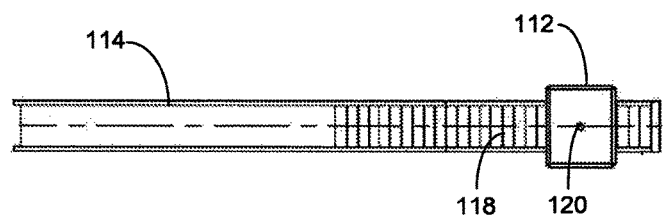
FIG. 5 is top view of a multi-positional closure fastener.

Looking now at the top view of the fastener 100 in FIG. 5, the strap 114 is a traditional nylon zip tie. The strap 114 is defined by an insertion tab 116 on one of its ends that is configured to be inserted into any adjacent openings 104 of adjacent housings 112. The insertion tab 116 may have a gear rack with a plurality of flexible grips 118 that selectively engage a hinged latch 110 in the fastening mechanism 108 of the receivers 102a, 102b. The grips 118 may be aligned in a channel 120 on the strap 114. In this manner, myriad combinations of fasteners 100 and straps 114 can fasten together to expand the diameters and lengths of the straps 114 for fastening, while also forming the minimal stress on the straps 114.

The fastening mechanism 108 may be adjustable, pliable, and oriented to engage variously oriented insertion tabs 116 from the straps 114. In one embodiment, the fastening mechanism 108 orients upwardly. In another embodiment, the fastening mechanism 108 orients downwardly. In another embodiment, the fastening mechanism 108 orients at an angle.

Figure 6:
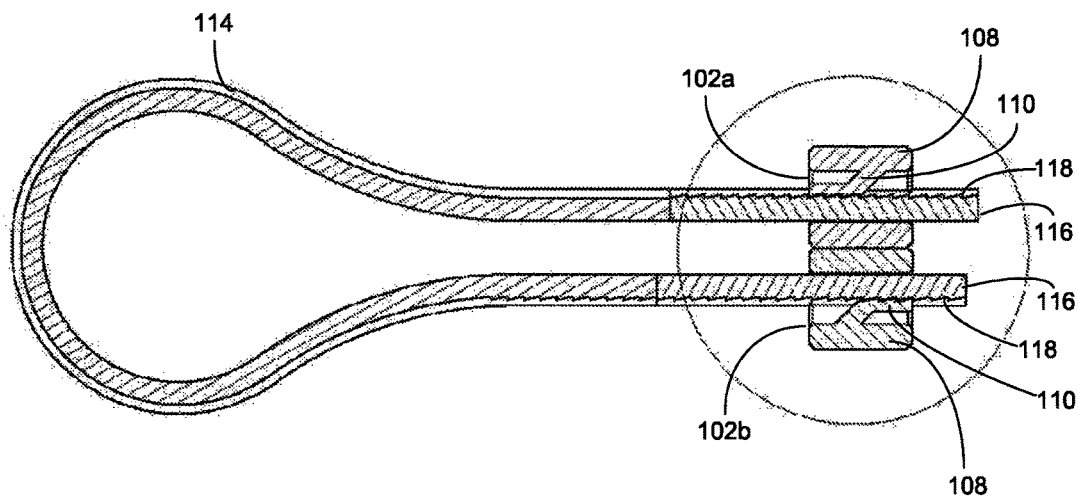
FIG. 6 is a sectioned side view of a multi-positional closure fastener.

As illustrated in FIG. 6, the fastening mechanism 108 may include different types of ratcheting devices having a hinged latch 110 that selectively engages with flexible grips 118 on the insertion tab 116 of the strap 114. In one possible embodiment, the insertion tab 116 at the terminus of the strap 114 includes a gear rack that selectively passes through the ratcheting device. The gear rack comprises a plurality of flexible grips 118 that are axially spaced on the insertion tab 116 in a longitudinal direction thereof.

In another embodiment the housing 112 further comprises of a second fastening mechanism (not shown in the drawings) that is disposed on a separate part of the inner surface. The second fastening mechanism allows the strap 114 to come into the opening at angles that will distort a linear line of the strap 114 up to angles of 180 degree, such that it allows the strap 114 to lock whether it has one of its faces up or down.

Figure 7:
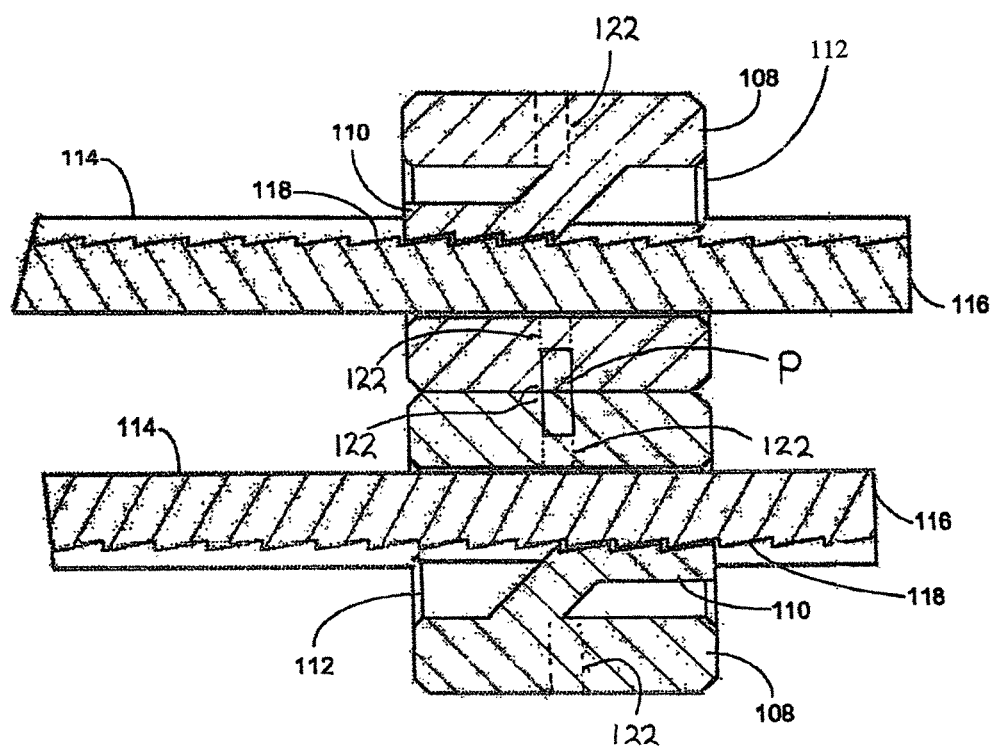
FIG. 7 is a close-up view of an exemplary hinged latch from the receiver engaging an exemplary plurality of flexible grips on the insertion tab of the strap.

Looking now at FIG. 7, at least one holding space forms between any two adjacent ones of the axially-spaced flexible grips 118. The holding space has a longitudinal length defined by a distance between the two adjacent flexible grips 118. In this manner, the hinged latch 110 in the ratcheting device locks the flexible grips 118 from the insertion tab 116 into place to form a secure connection between the fastener 100 and the strap 114.

Suitable materials for the fastener 100 may include, without limitation, nylon, polyurethane, pliable polymers, aluminum, metal alloys, rubber, and fibers. The fastener 100 is generally used to bundle wires, hoses, and smaller items. Though in one alternative embodiment, a stainless steel version, of the fastener 100, either naked or coated with a rugged plastic, can be used for exterior applications and hazardous environments.

In operation, each receiver 102a, 102b may engage a corresponding strap 114 in a direct linear engagement. In this configuration, the insertion tab 116 from the strap 114 passes through the ratcheting device, such that the gear rack and plurality of flexible grips 118 passes through the ratcheting mechanism. The strap 114 may then loop around to connect to an adjacent ratcheting mechanism. In both engagements, the insertion tab 116 slides through the most proximal opening 104 to the ratcheting device until the desired length or diameter is achieved.

In this manner, the ratchet mechanism locks the flexible grips 118 from the insertion tab 116 into place to form a secure connection between the fastener 100 and the most proximal strap 114 (FIG. 7). In another embodiment, three or more fasteners 100, with each fastener 100 having a plurality of adjacent receivers 102a, 102b may be fastened to a plurality of straps 114 in series to form a substantially larger fastening capacity.

In some embodiments, a cutting member (not shown) may be used to cut either end of the straps 114 to a desired length after the desired closure with the corresponding receiver has been achieved. The cutting member may be used to apply the strap 114 with a specific degree of tension. For example, the cutting member may cut off the insertion tab 116 flush with the opening 104 in the receiver in order to avoid a sharp edge which might otherwise cause injury. The cutting member forms a substantially smooth cut.

Figure 8:
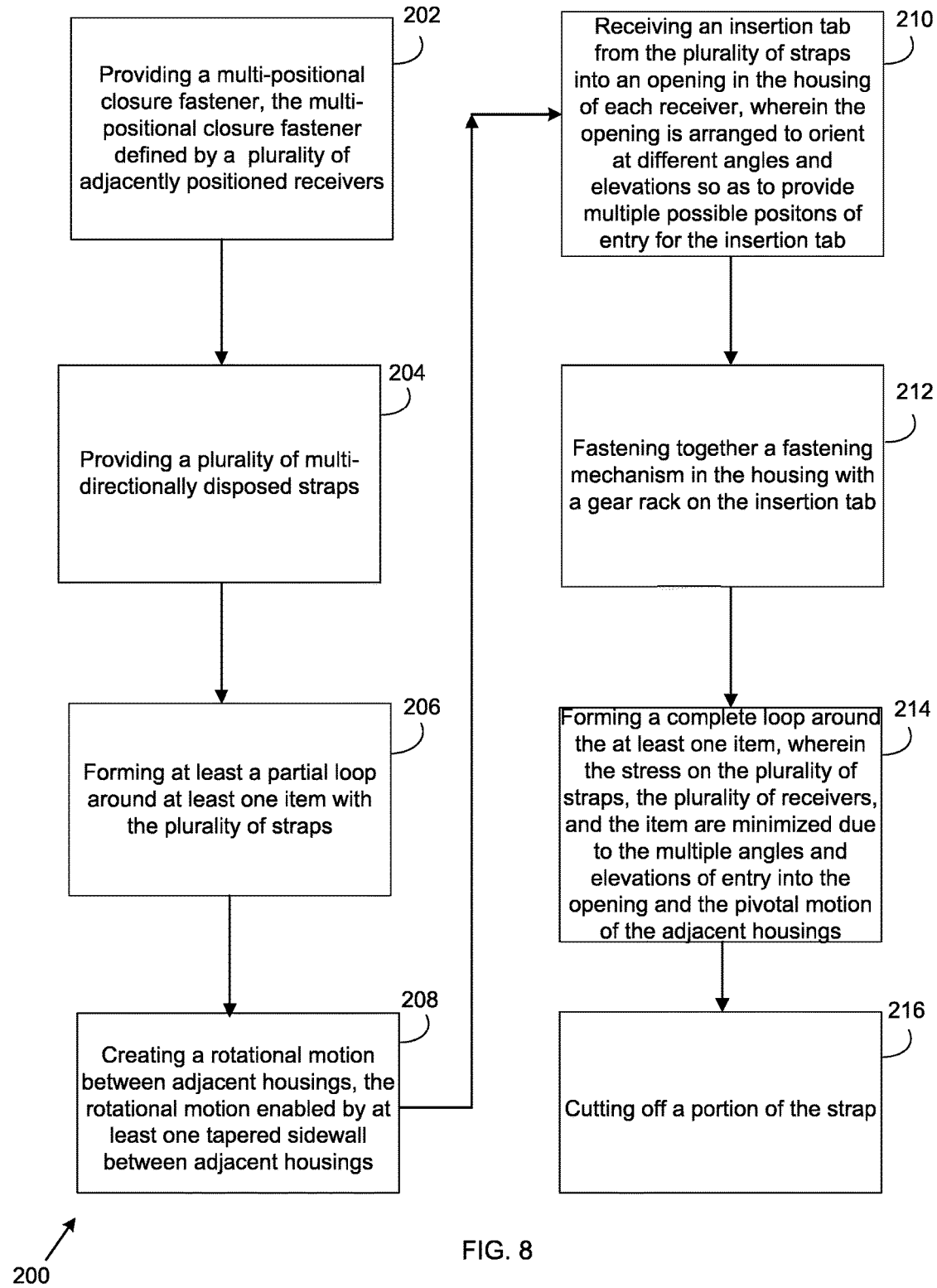
FIG. 8 is a flowchart diagram of an exemplary method for fastening at least one item with a multi-positional closure fastener.

FIG. 8 illustrates a flowchart diagram of an exemplary method 200 for fastening a plurality of straps 114 with a multi-positional closure fastener 100. The method 200 may include a fastener 100 having a plurality of receivers 102a, 102b that orient at different angles and elevations relative to each other. This multi-positional disposition of adjacent receivers 102a, 102b facilitates the reception of the straps 114 from multiple angles, elevations, and directions. This is because there is greater possibilities of proximity between the straps 114 and the receivers 102a, 102b due to the multiple possible orientations and flexible movement of the receivers 102a, 102b.

The method 200 may include an initial Step 202 of providing a multi-positional closure fastener 100, the multi-positional closure fastener 100 defined by a plurality of receivers 102a, 102b, the plurality of receivers 102a, 102b being adjacently joined. The fastener 100 may include a plurality of receivers 102a, 102b disposed adjacently, and in nonplanar alignment with each other. The receivers 102a, 102b orient at different angles and elevations relative to each other. The receivers 102a, 102b may further include tapered sidewalls that enable a slight rotational motion between adjacent receivers 102a, 102b.

The method 200 may further comprise a Step 204 of providing a plurality of multi-directionally disposed straps 114. The straps 114 are defined by an insertion tab 116 on one of its ends that is configured to be inserted into any adjacent openings 104 of adjacent housings 112. In this manner, myriad combinations of fasteners 100 and straps 114 can fasten together to expand the diameters and lengths of the straps 114 for fastening, while also forming the minimal stress on the straps 114.

A Step 206 includes forming at least a partial loop around at least one item with the plurality of straps 114. Each receiver 102a, 102b may engage a corresponding straps 114 in a direct linear engagement. In this configuration, the insertion tab 116 from the strap 114 passes through the ratcheting device, such that the gear rack and plurality of flexible grips 118 passes through the ratcheting mechanism. The strap 114 may then loop around to connect to an adjacent ratcheting mechanism. In both engagements, the insertion tab 116 slides through the most proximal opening 104 to the ratcheting device until the desired length or diameter is achieved.

In some embodiments, a Step 208 comprises creating a rotating motion between adjacent housings 112, the rotating motion is enabled by at least one tapered sidewall between adjacent housings 112. The space formed therebetween also facilitates engagement with the strap 114 and increases the spatial arrangement by the strap 114 when forming a loop.

A Step 210 includes receiving an insertion tab 116 from the plurality of straps 114 into an opening 104 in the housing 112 of each receiver 102a, 102b, wherein the opening 104 is arranged to orient at different angles and elevations so as to provide multiple possible positions of entry for the insertion tab 116. The slight pivot between adjacent housings 112, in addition to the aforementioned multi-directional capacity of the housings 112 creates greater proximity to a corresponding insertion tab 116 from the straps 114.

In some embodiments, a Step 212 may include fastening together a fastening mechanism 108 in the housing 112 with a gear rack on the insertion tab 116. The insertion tab 116 from the strap 114 passes through the ratcheting device, such that the gear rack and plurality of flexible grips 118 passes through the ratcheting mechanism. The fastening mechanism 108 may include different types of ratcheting devices having a hinged latch 110 that selectively engages with flexible grips 118 on the insertion tab 116 of the strap 114. In one possible embodiment, the insertion tab 116 at the terminus of the strap 114 includes a gear rack that selectively passes through the ratcheting device. The gear rack comprises a plurality of flexible grips 118 that are axially spaced on the insertion tab 116 in a longitudinal direction thereof.

A Step 214 comprises forming a complete loop around the at least one item, wherein the stress on the plurality of straps 114, the plurality of receivers 102a, 102b, and the item are minimized due to the multiple angles and elevations of entry into the opening 104 and the rotational motion of the adjacent housings 112. The strap 114 may loop around to connect to an adjacent ratcheting mechanism. In both engagements, the insertion tab 116 slides through the most proximal opening 104 to the ratcheting device until the desired length or diameter is achieved.

A final Step 216 includes cutting off a portion of the strap 114. In one possible embodiment, a cutting member may be used to cut either end of the straps 114 to a desired length. The cutting member forms a smooth cut and may use tension, sharp edges, or heat to perform the cut.

While the inventor's above description contains many specificities, these should not be construed as limitations on the scope, but rather as an exemplification of several preferred embodiments thereof. Many other variations are possible. For example, the multi-positional closure fastener 100 may be extendable or stretchable to further increase the fastening capacity with the corresponding insertion tab 116 from the strap 114. Accordingly, the scope should be determined not by the embodiments illustrated, but by the appended claims and their legal equivalents.

The claims elected are as follows:

1. A multi-positional closure fastener for fastening a plurality of multi-directional straps, the fastener comprises:
   two receivers disposed adjacently to each other, each receiver defined by a housing and an opening, the housing for each receiver oriented in a different plane than an adjacent housing, the housing for each receiver having a least on tapered sidewall, the opening for each receiver oriented at a different angle than an adjacent opening;
   a pin hole on each housing with a pin passing therethrough to allow for rotational movement between each housing; and
   a fastening mechanism, the fastening mechanism disposed to position within the opening of each receiver, the fastening mechanism configured to enable fastening.

2. The fastener of claim 1, wherein the plurality of receivers are configured to securely fasten to a plurality of straps.

3. The fastener of claim 2, wherein the fastener is generally a zip tie fastener.

4. The fastener of claim 3, wherein the fastener is a nylon material composition.

5. The fastener of claim 4, wherein the plurality of straps are generally zip ties.

6. The fastener of claim 5, wherein the plurality of straps are a nylon material composition.

7. The fastener of claim 1, wherein the at least one tapered sidewall forms between adjacent housings.

8. The fastener of claim 1, wherein the opening has a generally square cross sectional shape.

9. The fastener of claim 1, wherein the opening has an inner surface.

10. The fastener 9, wherein the fastening mechanism is disposed on the inner surface.

11. The fastener of claim 1, further comprising a second fastening mechanism that is disposed on a separate part of the inner surface.

12. The fastener of claim 1, wherein the fastening mechanism is a ratcheting device.

13. The fastener of claim 12, wherein the ratcheting device is defined by a hinged latch.

14. A multi-positional closure fastener for fastening a plurality of multi-directional straps, the fastener comprises:
   two receivers disposed adjacently to each other, each receiver defined by a housing and an opening, the housing for each receiver oriented in a different plane than an adjacent housing, the housing for each receiver having a least on tapered sidewall, the opening for each receiver oriented at a different angle than an adjacent opening;
   a pin hole on each housing with a pin passing therethrough to allow for rotational movement between each housing; and
   a fastening mechanism, the fastening mechanism disposed to position within the opening of each receiver, the fastening mechanism configured to enable fastening; and
   a plurality of straps, the plurality of straps defined by a body and an insertion tab, the insertion tab configured to mate with the fastening mechanism, wherein the pivotal movement between adjacent housings increases the spatial arrangement of the straps.

15. The fastener of claim 14, wherein the fastener is generally a zip tie fastener.

16. The fastener of claim 14, wherein the plurality of straps are generally zip ties.

17. The fastener of claim 14, wherein the at least one tapered sidewall forms between adjacent housings.

18. The fastener of claim 14, wherein the fastening mechanism is a ratcheting device.

* * * * *